Oct. 12, 1943.     F. B. VALENTINE     2,331,640
EYE GLASSES
Filed Nov. 6, 1940
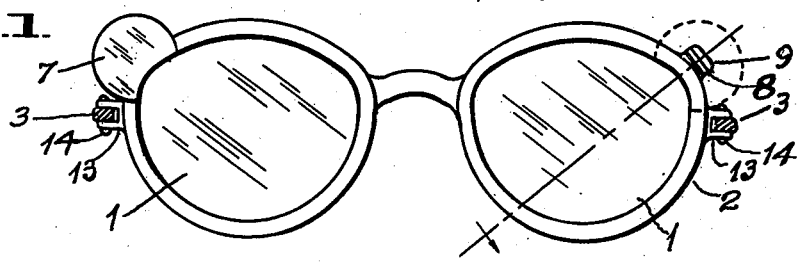
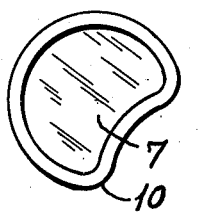
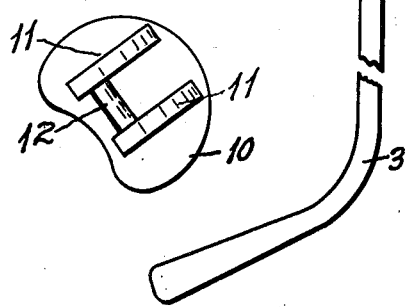
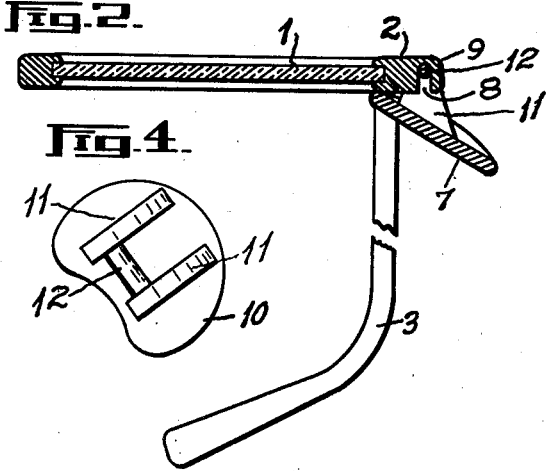
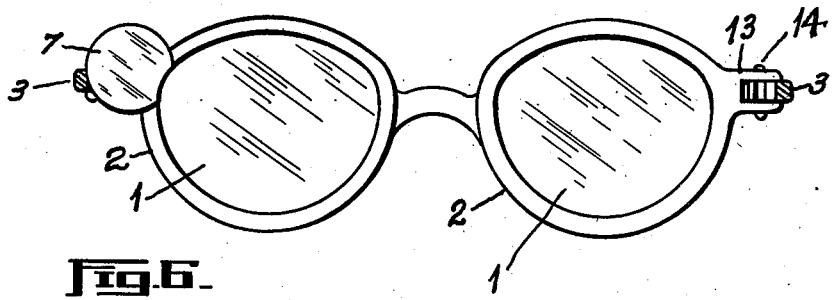
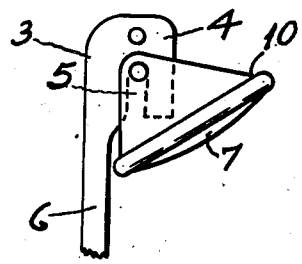
Inventor
Frank B. Valentine
By
Charles W. Dake
Attorney Patented Oct. 12, 1943

2,331,640

UNITED STATES PATENT OFFICE 2,331,640

EYEGLASSES

Frank B. Valentine, Chicago, Ill.

Application November 6, 1940, Serial No. 364,505

5 Claims. (Cl. 88—41)

My present invention relates to improvements in eye glasses, and particularly to such eye glasses as are worn by people in open spaces such as on highways, and the objects of improvement are, first, to provide an eyeglass that will permit seeing backward without turning the head; second, to provide a pair of eye glasses that will permit seeing backward without turning the head; third, to provide eye glasses having means to project the image of objects in the rear of a person wearing the glasses without turning the head; fourth, to provide eye glasses having rear and forward vision; fifth, to provide eye glasses having rear object reflecting means such as a mirror or prism removably secured to the frame thereof; and sixth, to provide eye glasses having one or more reflecting mirrors or prisms.

These named objects, and such other objects as appear from a perusal of the following description are obtained by the structure disclosed by the accompanying drawing, in which—

Figure 1 is a rear elevation view of my improved eye glass, the view showing a rear object reflector detachably secured to the lens supporting frame at the upper left above the ear engaging bow, and at the upper right, the rear object mirror in broken line with the slotted reflector engagement lug in full line, and the ear engaging bows in cross-section.

Figure 2 is an enlarged cross-sectional view of my improved eye glasses taken through the right glass on the broken line of Figure 1, and looking in the direction the arrow at the left of the line indicates.

Figure 3 is an enlarged view of the left rear object reflecting mirror looking at the reflecting side thereof and showing a surrounding bezel for protecting the edge of the reflector.

Figure 4 is an enlarged back view of the rear object reflector illustrating one means by which the reflector can be adjustably and detachably secured to the frame as shown in Figure 1, or to the bows as shown in Figure 5.

Figure 5 is an elevation view of my improved eye glasses looking from the eye adjacent side and showing one rear object reflector as secured to one ear engaging bow and sufficiently high to permit unobstructed side vision.

Figure 6 is an enlarged side view of one of the rear object reflectors and a portion of one of the ear engaging bows, the view illustrating my preferred method of securing the reflector to the ear engaging bows.

Throughout the several views comprising the drawing, similar numerals designate similar parts or portions, and referring thereto:

Numeral 1 designates the eye glass lenses, 2 the lens supporting frame having hingedly secured thereto at opposite sides, ear engaging bows 3, as shown in Figures 5 and 6 having an enlarged portion 4 and slot 5 extending therein substantially parallel with the shank 6 of the bow. In Figures 1 and 2 the rear object reflector 7 is detachably and adjustably secured to the lens supporting frame 2, by slot 8 in lug 9 extending outward from and forming a part of the lens supporting frame. The rear object reflector 7 is preferably produced from optical glass as by pressing, grinding and polishing, and silvered to produce a reflecting surface and mounted in a supporting frame or bezel 10 having a pair of lugs 11 and a pin 12 extending through and between the lugs 11 for an engagement in the slot 5 of enlarged portion 4 of the bow 3, or the slot 8 of lug 9 of the lens supporting frame. The ear engaging bows 3 are secured to the lens supporting frame in the slots of lugs 13 which extend horizontally from opposite ends of the lens supporting frame 2, by pivot pins 14.

While the drawing of my improved eye glass would indicate the frame and ear engaging bows as made of a plastic material, it is to be understood that they can be produced wholly of metal, and that the lens and reflectors can be of synthetic glass or transparent plastic.

In using my eye glasses, they are worn in the usual manner of wearing conventional eye glasses and like them, objects in front of the wearer are viewed through the lenses supported by the frames of the glasses while objects at the sides are seen by either turning the head or the eyes to right or left, but objects back of the wearer cannot be seen at all, for which purpose, my eye glasses have the added feature in that objects back of the wearer can be seen by glancing into either one of the mirrors which are preferably removably secured to the frame slightly above a horizontal line drawn through the axes of the lenses of the glasses, and which mirrors are readily adjustable to any desired angle for reflecting the image of objects back of the wearer to the axis of the eye.

Having described my present invention, the rights which I desire to secure are set forth in the claims following.

I claim:

1. In eye glasses, the combination of a frame for supporting a pair of forward vision lenses in horizontally spaced apart relation to each other, a pair of bows hingedly connected to said frame and extending back therefrom, a slotted lug on the frame above each bow and in spaced apart relation thereto, a pair of reflectors each detachably supported by a pin transversely slidable in the slot of one of said lugs, each reflector having a reflecting surface in inclined relation to the plane of the said forward vision lenses and above a line extending horizontally through the axis of each lens, the said reflectors being adjustable in inclined relation to the plane of the lenses substantially as described.

2. The combination in an eye glass having a lens supporting frame with a pair of bows extending backward therefrom, of a lug extending outward from the frame above each of the said bows and having an open sided slot, a reflector having a pair of lugs at its back in spaced apart relation to each other with a pin extending through both lugs and through the slot of the lug on the frame and slidable therein for adjustably supporting the said reflector, all substantially as set forth.

3. The combination in an eye glass, of a lens supporting frame having a pair of bows extending backward therefrom, a lug extending outward from the frame above one of the bows, the said lug having an open sided slot, a reflector having a pivot pin at its back in spaced apart relation thereto and frictionally held in the slot and adapted to be slid transversely of the slot, all substantially as described.

4. The combination in an eye glass, of a lens supporting frame having a pair of bows extending backward therefrom, a lug extending outward from the frame and having an open sided slot, a reflector having a pivot pin at its back in spaced apart relation thereto and extending substantially longitudinally through the slot and adapted to be slid transversely of the slot for adjusting the angular relation of the reflector with the bows, all substantially as described.

5. The combination in an eye glass, of a lens supporting frame having a bow extending backward from the frame and over the ear of the wearer, and having an open sided slot in angular relation to the bow, a mirror having a pin in spaced apart relation to its back, and extending longitudinally through the slot and frictionally held in the slot whereby the mirror can be adjusted in both vertical and horizontal planes.

FRANK B. VALENTINE.